UNITED STATES PATENT OFFICE.

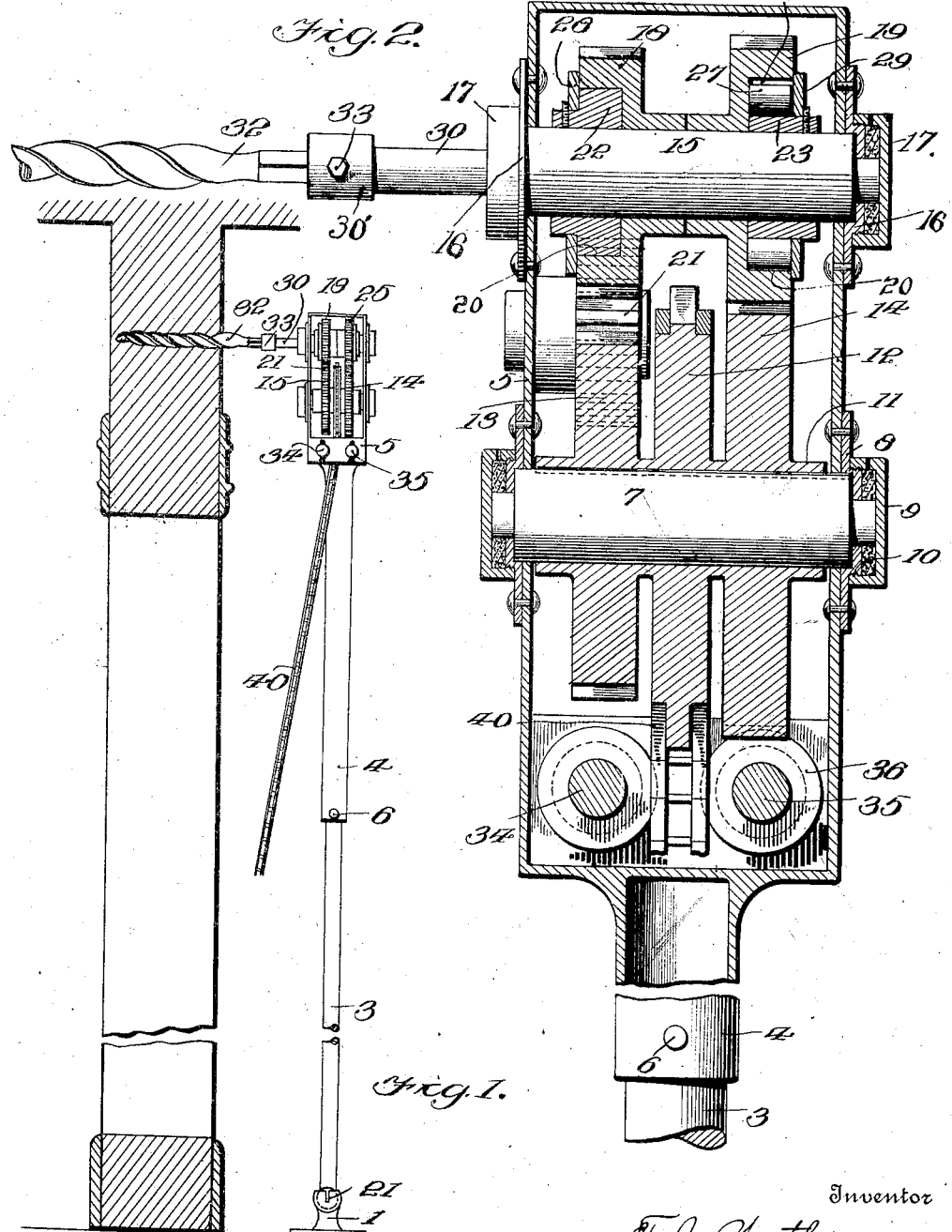

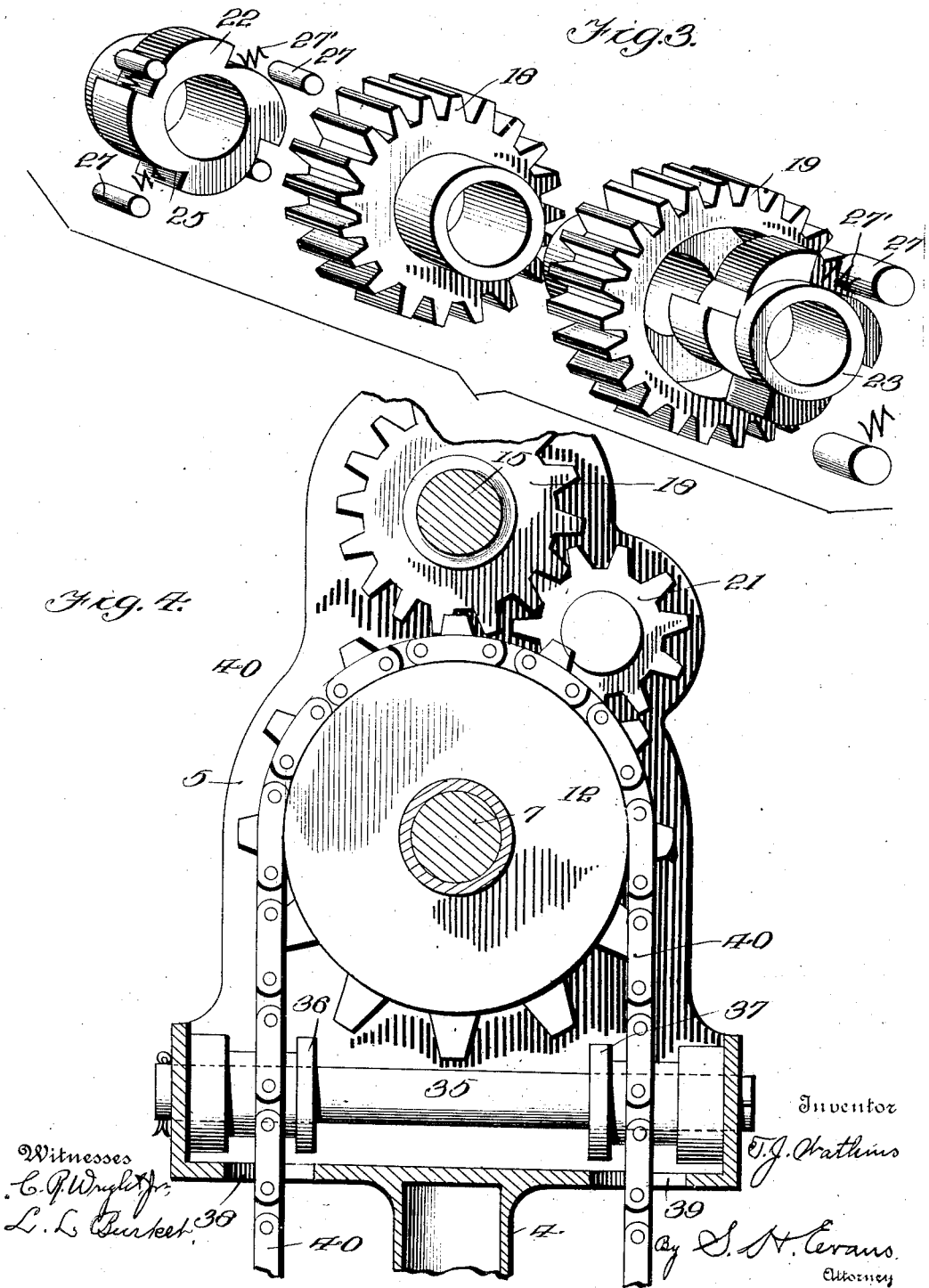

THOMAS J. WATKINS, OF RICHMOND, VIRGINIA.

BORING-MACHINE.

1,056,610.  Specification of Letters Patent.  Patented Mar. 18, 1913.

Application filed December 6, 1911. Serial No. 664,299.

*To all whom it may concern:*

Be it known that I, THOMAS J. WATKINS, a citizen of the United States, residing at Richmond, in the county of Henrico and State of Virginia, have invented certain new and useful Improvements in Boring-Machines, of which the following is a specification.

My invention relates to improvements in boring machines.

The object of my invention is to provide a machine for boring holes in joists or walls where it is impossible to use the ordinary auger, and it is more particularly designed for electric wiring purposes.

Another object of my invention is to provide a machine of this character which can be operated from the ground or floor and in which the operation thereof tends to cause the feeding or forcing of the bit forward to cause it to cut.

Another object of my invention is to provide a simple, cheap and effective machine having certain details of structure hereinafter more fully set forth.

In the accompanying drawings—Figure 1 is a side elevation of my improved machine in operation; Fig. 2 is an enlarged vertical transverse sectional view of the bit operating mechanism; Fig. 3 is a detached perspective view of the two drive gears mounted upon the bit shaft and showing the arrangement of the clutch mechanism; and Fig. 4 is a vertical sectional view taken at right angles to Fig. 2.

Referring now to the drawings, 1 represents a base which is adapted to rest upon the floor and which preferably has pivoted thereto, at 2, a rod 3, said rod telescoping in a tube 4 carried by the casing 5. The said tube and rod are held in their adjusted position by means of a set-screw 6, whereby the casing carrying the auger operating mechanism may be elevated or lowered, as desired.

The casing 5, as shown in Fig. 4, is of an elongated form having mounted therein, at about the center, a shaft 7, which has its ends mounted in bearings 8 secured on the outside of the casing. Covering the bearings are caps 9, screwed thereon, as indicated at 10, and by means of which the shaft 7 is lubricated.

Keyed upon the shaft 7 is a sleeve 11, having at its center a sprocket wheel 12 which is the main drive of the machine, as will be hereinafter more fully described. Carried by the said sleeve on one side of the sprocket 12 is a small gear 13, while on the opposite side of the sprocket, and carried by the sleeve is a larger gear 14. Mounted in the upper end of the casing is a shaft 15, mounted in bearings 16 in the same manner as the shaft 7, and the said bearings are closed by the screw caps 17. Loosely mounted upon the said shaft 15 are two gears 18 and 19 which have annular grooves 20 surrounding the shaft, the purpose of which will be hereinafter more fully described. The gear 19 meshes with the gear 14 and is thereby driven in the reverse direction as the shaft 7 driven by the sprocket 12. The gear 18 meshes with an idle gear 21 mounted in the casing 5 and the idle gear in turn meshes with the gear 13. By this arrangement, it will be seen that the gear 18 is driven in the opposite direction to that of the gear 19.

The shaft 15 is provided with two clutch members 22 and 23 which are secured against rotation on the shaft and extend within the annular grooves 20 of the gears 18 and 19. These clutch members, as shown in Fig. 3, have in their outer peripheries a series of cam-shaped recesses 25, the recesses of both clutch members extending in the same direction.

Within the recesses of the clutch members are rollers 27, the diameters of which are less than the greatest depth of the recesses 25. The rollers are held within the recess at one end by the gears 18 and 19, while the clutch members 22 and 23 have removably secured thereto the rings 28 and 29. The rollers 27 are normally held toward the small end of the recess by a coil spring 27'. The outer end of the shaft 15 is provided with an extension 30, having a socket 30' to receive the auger 32, said auger being held in the socket by means of the set-screw 33. The lower end of the casing is provided with two shafts 34 and 35, which are parallel with each other and are arranged at right angles to the shaft 7. Loosely mounted upon each shaft are two spools 36 and 37 which are free to move longitudinally on their shafts. The casing 5 between the shafts and in a vertical alinement with the sprocket 12 is provided with two openings 38 and 39. Passing around the sprocket 12 is a sprocket chain 40 which is preferably of an endless form and passes downwardly between the oppositely arranged pairs of rollers 36 and 37 of the shafts 34 and 35 and through the openings 38 and 29 in the casing.

In operation, the base 1 is placed upon the floor adjacent the joist or wall in which it is desired to bore the hole. The casing is adjusted the proper length and locked by the set-screw 6. The operator then stands upon the side of the support or casing which carries the bit and by drawing down upon the chain first on one side and then on the other, the sprocket 12 is caused to oscillate. When moving in one direction the gear 14 drives the gear 19 and the rollers 27 travel toward the small end of the recesses in the clutch member and the shaft 15 is locked to the gear and which in turn operates the bit. Upon the movement of the sprocket 12 in the opposite direction the rollers 27 travel toward the larger end of the recesses and the gear 19 is unlocked from the shaft 15. Simultaneously with this operation the gear 13 rotates the idle gear 21, which in turn rotates the gear 18 and the rollers lock the gear 18 through the clutch member 22 to the shaft 15 and the said shaft is caused to continue its rotation in the same direction.

From Fig. 1, it will be seen that the pull upon the chain will tend to feed the bit and by operating the device with both hands causes a more rapid and steady rotation of the bit. The chains engage the rollers 36 and 37, which prevent it from engaging the walls of the openings 38 and 39 when the pull on the chain is not straight and allows a free movement thereof.

Having thus fully described my invention, what I claim as new and desire to secure by Letters Patent is—

1. A boring machine, comprising a casing, a bit shaft in the casing, a gearing in the said casing for driving the shaft, a sprocket chain driving the gearing by its movement in either direction and causing the bit shaft to rotate in the same direction, and passing loosely down through casing and adapted to be moved laterally and sprocket spools carried by the lower end of the casing and having their axes at right angles to that of the sprocket wheel and between which the chain passes.

2. A boring machine, comprising a casing, a support for the casing, a shaft within the casing, a sprocket wheel carried by the shaft, a small gear carried by the shaft on one side of the sprocket, a large gear carried by the shaft on the opposite side of the sprocket, an idle gear meshing with the smaller gear, a shaft mounted in the upper end of the casing, a bit socket carried by the shaft, a gear loosely mounted upon the said shaft meshing with the idle gear, a clutch mechanism for locking the gear on the shaft in one direction, a second gear carried by the shaft for meshing with the larger gear carried by the sprocket shaft, a clutch mechanism for locking the gear on the shaft in the same direction as the clutch of the other gear, a sprocket chain passing around the sprocket and extending downwardly through the casing.

3. A boring machine, comprising a casing, a vertically adjustable support for the casing, a shaft carried by the lower end of the casing, a sprocket secured upon the shaft, a second shaft mounted in the upper end of the casing, a bit socket carried by the outer end of the said shaft, the lower end of the casing having two openings in alinement with the periphery of the sprocket, two shafts carried by the casing and extending at right angles to the sprocket shaft on opposite sides of the openings in the casing, a spool carried by each shaft on opposite sides of the openings, a gearing carried by the sprocket shaft for rotating the bit shaft in the same direction by the movement of the sprocket shaft in either direction, and an endless sprocket chain passing over the sprocket, and passing downwardly between the spools and through the openings in the casing.

In testimony whereof I affix my signature in presence of two witnesses.

THOMAS J. WATKINS.

Witnesses:
S. H. EVANS,
W. W. NEALE.